C. A. PARSONS, R. J. WALKER, S. S. COOK AND R. A. SIMON.
TURBINE INSTALLATION FOR SHIP PROPULSION.
APPLICATION FILED SEPT. 18, 1915.

1,303,585.

Patented May 13, 1919.
6 SHEETS—SHEET 1.

Inventors
Charles A. Parsons,
Robert J. Walker,
Stanley S. Cook,
Ramsey A. Simon, By Spear Middleton Donaldson & Spear
Attorneys

C. A. PARSONS, R. J. WALKER, S. S. COOK AND R. A. SIMON.
TURBINE INSTALLATION FOR SHIP PROPULSION.
APPLICATION FILED SEPT. 18, 1915.

1,303,585.

Patented May 13, 1919.
6 SHEETS—SHEET 6.

*Inventors:*
*Charles A. Parsons,*
*Stanley S. Cook,*
*Robert J. Walker,*
by *Spear, Middleton, Donaldson & Spear*
ATTORNEYS.

UNITED STATES PATENT OFFICE.

CHARLES ALGERNON PARSONS, OF NEWCASTLE-UPON-TYNE, AND ROBERT JOHN WALKER, STANLEY SMITH COOK, AND RAMSAY ALEXANDER SIMON, OF WALLS-END, ENGLAND; SAID WALKER, COOK, AND SIMON ASSIGNORS TO SAID PARSONS.

TURBINE INSTALLATION FOR SHIP PROPULSION.

1,303,585.          Specification of Letters Patent.      Patented May 13, 1919.

Application filed September 18, 1915. Serial No. 51,495.

*To all whom it may concern:*

Be it known that we, the Honorable Sir CHARLES ALGERNON PARSONS, K. C. B., residing at Heaton Works, Newcastle-upon-Tyne, in the county of Northumberland, England, ROBERT JOHN WALKER, STANLEY SMITH COOK, and RAMSAY ALEXANDER SIMON, all subjects of the King of Great Britain and Ireland, residing at Turbinia Works, Wallsend-on-Tyne, in the county of Northumberland, England, have invented certain new and useful Improvements in and Relating to Turbine Installations for Ship Propulsion, of which the following is a specification.

The present invention relates to marine turbine installations of the type in which the ratio of the revolutions of a turbine to the revolutions of the propeller it drives differs at low powers from the ratio at full power.

The present invention has for its object the economical employment at cruising or low power conditions of the main or full power turbines, and the efficient utilization of the energy of the steam throughout its full range of expansion, from boiler pressure to the high condenser vacuum usually obtainable under such conditions.

Loss in efficiency under low power conditions is due to two causes: (1) the reduction of initial steam pressure at the turbines which leads to a portion of the available energy of expansion not being utilized in the turbine, but lost through throttling at the valve; and (2) the reduction of blade speed due to reduced speed of propeller entailing inefficient utilization of the remainder of this energy.

Arrangements have previously been proposed whereby the range of steam expansion utilized is increased, viz., by fitting cruising stages or separate cruising turbines exhausting into the main turbines, or by so connecting main turbines which at full power operate in parallel that at low power they receive steam in series. These arrangements, however, while increasing the range of steam expansion utilized, do not avoid the inefficient utilization of a part of the expansion in the main turbines on account of their reduced speed.

It has also been previously proposed to adopt complete cruising turbines separate from the main turbines, and operating on the full range of expansion from boiler pressure to condenser vacuum, and which, being connected to the propeller shaft through reduction gearing, can run at a sufficiently high speed to give efficient utilization of the full energy under low power conditions.

In order to avoid the second cause of inefficiency mentioned above, it has also been proposed in connection with the application of turbines to the propulsion of ships to provide dynamo electric power transmission means for the purpose of varying the revolution ratio between a turbine and the propeller it drives, at different loads, and it has further been proposed where a reciprocating internal combustion engine is employed in a marine installation as an auxiliary motor to a steam turbine driving a common propeller, to provide a gear box to increase the propeller revolutions with respect to the engine at full powers, and to decrease the propeller revolutions with respect to the engine at low powers.

The present invention consists in the use in an installation of the type indicated of special or additional toothed transmission gearing to maintain the speed of the main turbines at low powers, in combination with means for maintaining an efficient range of expansion in the turbines.

The invention further consists in the various arrangements in which additional toothed transmission gearing is provided for operating the propeller shafts at low powers hereinafter described.

Astern turbines may be arranged to operate any of the propeller shafts. In cases where the main turbines operate through gearing at both full and cruising powers, the gear wheels not in use may be disconnected by clutches in addition to disconnecting the turbine rotors from the pinions. Gear may be provided whereby the various clutches may be operated simultaneously when changing from one power to another. They may be operated, for instance, by telemotors, or they may be provided with interlocking mechanism in conjunction with the valve system, so that steam cannot be admitted to a turbine unless all the clutches are in correct position. The clutches may be of the claw, friction, electrical or any suitable type. Further, in any of the described arrangements, the main turbines may be provided with cruising stages which may consist of reaction or impulse stages or combinations of both types.

Referring to the accompanying diagrammatic drawing:—

Fig. 6 illustrates an installation similar to Fig. 1 in which the turbines are of the multi-impulse type and are fitted with suitable steam controlling devices; while

Fig. 10 is a side elevation of the low pressure turbine with the clutches shown in section, while

Figure 1:
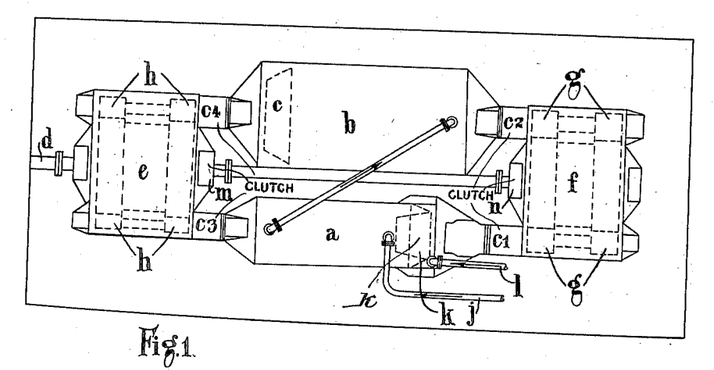
Figure 1 illustrates a single shaft installation embodying the present invention in which high and low pressure turbines are provided, both driving through gearing at high powers while for low powers a second set of gearing is provided having a ratio of reduction greater than the ratio of the high power gearing.

In carrying the present invention into effect according to the form illustrated in Fig. 1, a high pressure turbine $a$ and a low pressure turbine $b$ are provided, the low pressure turbine having incorporated with it an astern turbine $c$, while the high pressure turbine may have a cruising stage $k$ incorporated with it. The turbines $a$ and $b$ are disposed on either side of the propeller shaft $d$. Upon the shaft $d$ two double helical gear wheels $e$ and $f$ are mounted. The turbines $a$ and $b$ are connected to the gear wheel $f$ by pairs of pinions $g$, $g$, and to gear wheel $e$ by the pairs of pinions $h$, $h$. The ratio of reduction given by the pinions $h$, $h$, and the gear wheel $e$ is greater for each of the turbines than the ratio given by the pinions $g$, $g$, and the gear wheel $f$.

Clutches $c^1$, $c^2$, $c^3$ and $c^4$ are provided.

Under full power conditions the clutches $c^1$ and $c^2$ are closed, and the clutches $c^3$ and $c^4$ are open and steam is admitted to the high pressure turbine $a$ by the conduit $j$. The exhaust from $a$ passes to the low pressure turbine $b$ from whence it goes to the condenser. Under these conditions the propeller shaft $d$ is driven by the full power gearing $f$, $g$.

For low power conditions the clutches $c^1$, $c^2$, are open while the clutches $c^3$, $c^4$, are closed. Steam is admitted to the cruising stage $k$ of the high pressure turbine by the conduit $l$ and passes as before through the high pressure turbine to the low pressure turbine, and then to the condenser.

In some cases clutches $m$ and $n$ may be provided between the propeller shaft and each of the gear wheels $e$ and $f$ so that when the high power gearing is in operation and the clutches $c^3$, $c^4$, and $m$ are open, the gearing $e$, $h$ remains stationary, while when the low power gearing is in operation $c^1$, $c^2$ and $n$ are open, the high power gearing $f$, $g$ remains stationary.

The arrangement shown in Fig. 1 may, if desired, be modified by placing the gears adjacent to each other in a single gear case.

It is obvious of course that two or more shafts furnished in a similar manner to the shaft $d$ in Fig. 1 may be provided in one ship.

Figure 2:
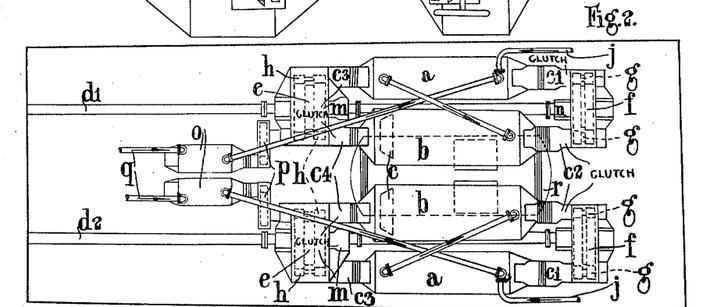
Fig. 2 illustrates diagrammatically an installation having two propeller shafts and sets of turbines similar to that illustrated in Fig. 1, each group of turbines having in addition a cruising turbine operating through double reduction gearing.

Fig. 2 illustrates the application in a two-shaft installation of two sets of turbines and gearing similar to that shown in Fig. 1, but each set having in addition cruising turbines $o$, $o$, operating the propeller shafts $d^1$, $d^2$, through double reduction gearing. The double reduction is obtained by mounting a gear wheel $p$ upon the spindle of each of the low pressure turbines and providing a pinion on the spindles of the cruising turbines and adapted to engage with the wheels $p$. In this installation, when running under cruising conditions steam is admitted to the cruising turbines by the conduits $q$, the exhaust from the cruising turbines then passing in series through the high and low pressure turbines $a$ and $b$ symmetrically on the two sides of the ship, passing ultimately to the condenser $r$. In this modification no cruising stages $k$ are provided in the high pressure turbines $a$, although they may be provided in addition to the separate cruising turbines.

Figure 3:
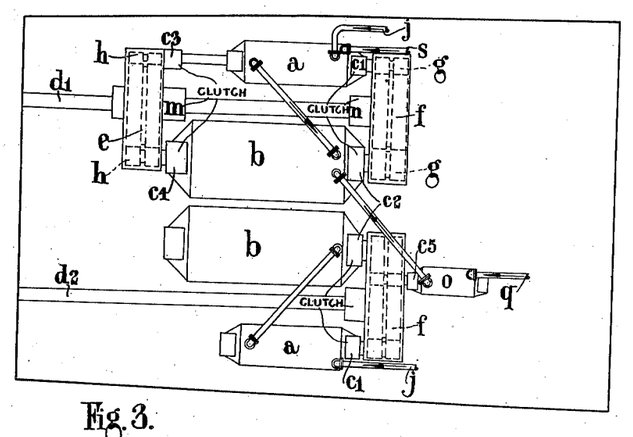
Fig. 3 illustrates a two-shaft installation in which one of the shafts is driven by a high and low pressure turbine having full power and low power gearings similar to Fig. 1, while the other shaft is driven by high and low pressure turbines operating through gearing at full power and adapted to be disconnected from their propeller shaft at low power, under which condition their propeller shaft is driven by a cruising turbine operating through single reduction gearing, the exhaust from the cruising turbine passing to the low pressure turbine upon the other shaft.

In the two-shaft installation shown in Fig. 3, one of the shafts $d'$ is provided with a set of turbines and high and low power gearing similar to that shown in Fig. 1, while the other shaft $d^2$ is provided with a high and low pressure turbine furnished with high power gearing only. The gear wheel $f$ upon the shaft $d^2$ is engaged by a pinion mounted upon the spindle of a cruising turbine $o$. Clutches are provided as in the previously described modifications.

Under full power conditions the clutches $c^1$, $c^2$ and $n$ are closed, while the clutches $c^3$, $c^4$, $c^5$ and $m$ are open. Steam is supplied to the high pressure turbines by the conduits $j$ and the exhaust from the high pressure turbines passes to the low pressure turbines $b$.

Under these conditions the shafts $d^1$, $d^2$, are driven through the high power gearing $f$, $g$.

Under cruising conditions the clutches $c^1$, $c^2$ and $n$ are open, while the clutches $c^3$, $c^4$, $c^5$ and $m$ are closed. Steam is admitted by the conduit $q$ to the cruising turbine $o$ which thus drives the shaft $d^2$. The exhaust from the cruising turbine passes to the low pressure turbine $b$ on the shaft $d^1$, while steam from auxiliary machinery is admitted to the high pressure turbine $a$ upon the shaft $d^1$ by the conduit $s$.

It will be understood that in some cases the exhaust from the cruising turbine $o$ may be taken to the high pressure turbine $a$ upon the shaft $d^1$ with or without the use of auxiliary steam, the exhaust from the cruising turbine $o$ in this case passing in series through the turbines $a$ and $b$ on the shaft $d^1$.

Figure 4:
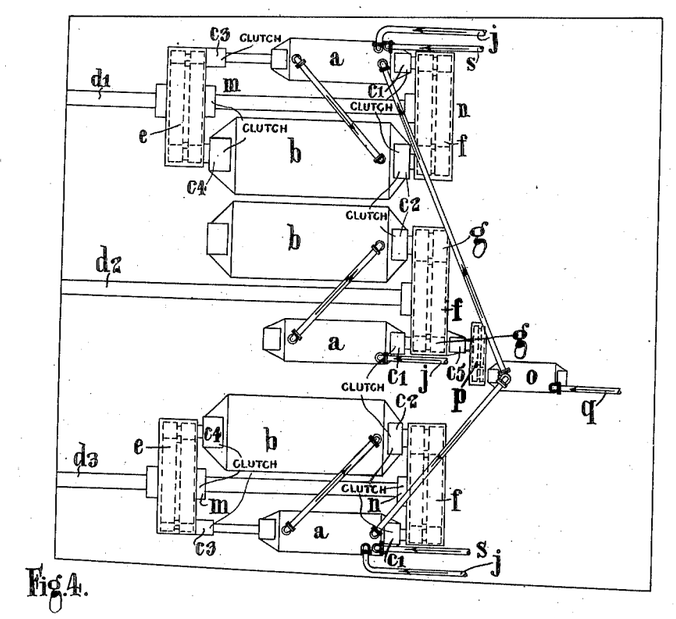
Fig. 4 illustrates a three-shaft installation in which the two wing shafts are driven by sets of turbines and gearings similar to those illustrated in Fig. 1, while the center shaft is driven by high and low pressure turbines operating through gearing at high powers and adapted to be disconnected from their propeller shaft at low powers, under which condition their propeller shaft is driven by a cruising turbine operating through double reduction gearing and exhausting to the high pressure turbines on each of the wing shafts.

Fig. 4 illustrates a three-shaft installation in which the wing shafts $d^1$ and $d^3$ are provided with high and low pressure turbines and high power and low power sets of gearing similar to those shown in Fig. 1, while the center shaft is provided with high and low pressure turbines actuating the shaft $d^2$ through gearing $f$, $g$. A cruising turbine $o$ operates the shaft $d^2$ through double reduction gearing obtained by mounting the gear wheel $p$ upon the spindle of the high pressure turbine $a$ driving the center propeller shaft $d^2$.

Under full power conditions the clutches $c^1$, $c^2$ and $n$ are closed, while the clutches $c^3$, $c^4$, $c^5$ and $m$ are open. Live steam is admitted to the high pressure turbines by the conduits $j$, the exhaust passing from the high pressure turbines to the low pressure turbines $b$. Under cruising conditions the clutches $c^3$, $c^4$, $c^5$ and $m$ are closed, while the clutches $c^1$, $c^2$ and $n$ are open. Live steam is admitted to the cruising turbine $o$ by the conduit $q$, which thus drives the center propeller shaft $d^2$, through double reduction gearing. The exhaust from the cruising turbine $o$ is divided and passes to the high pressure turbines $a$ upon the wing shafts. Exhaust from the high pressure turbines $a$ is delivered to the low pressure turbines $b$ upon the wing shafts and then passes to the condensers.

As an alternative to the steam flow shown in Fig. 4, the exhaust from the cruising turbine may be divided and pass to the low pressure turbines $b$, $b$ upon the wing shafts $d^1$, $d^3$, while auxiliary exhaust steam is led by the conduits $s$ to the high pressure turbines $a$ upon the wing shafts.

Figure 5:
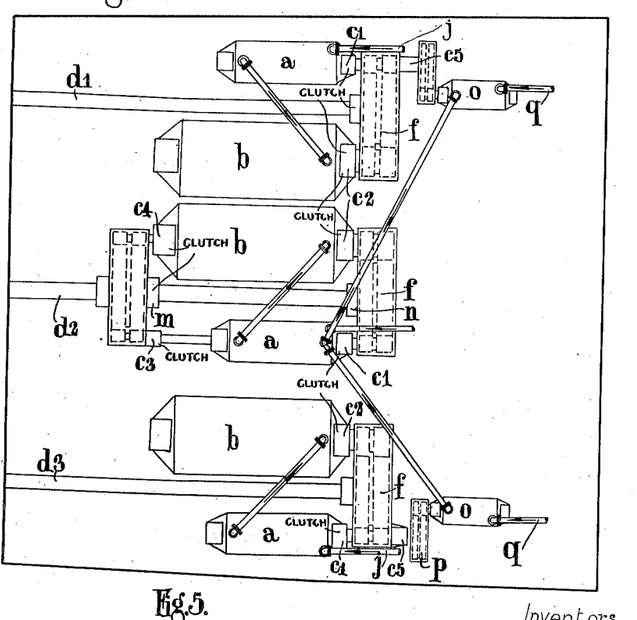
Fig. 5 illustrates an installation in which each of the wing shafts is driven by a similar set of turbines to the center shaft of Fig. 4, while the center shaft is driven by an installation similar to those driving the wing shafts in Fig. 4, the exhausts from the cruising turbines driving the wing shafts being led to the high pressure turbine upon the center shaft.

In the three-shaft installation illustrated in Fig. 5, the wing shafts $d^1$ and $d^3$ are provided with turbines and gearing similar to that provided upon the center shaft $d^2$ of Fig. 4, while the center shaft $d^2$ in Fig. 5 is provided with a set of turbines and gearings similar to those provided on the wing shafts in Fig. 4.

Under full power conditions the clutches $c^1$, $c^2$ and $n$ are closed, while the clutches $c^3$, $c^4$, $c^5$ and $n$ are open. Steam is admitted to the high pressure turbines through the conduits $j$.

Under cruising conditions the clutches $c^3$, $c^4$, $c^5$ and $m$ are closed, while the clutches $c^1$, $c^2$ and $n$ are open. Steam is admitted to the cruising turbines *o* by the conduits *q*, and the exhaust from the cruising turbines is led to the high pressure turbine *a* upon the center shaft.

Figure 6:
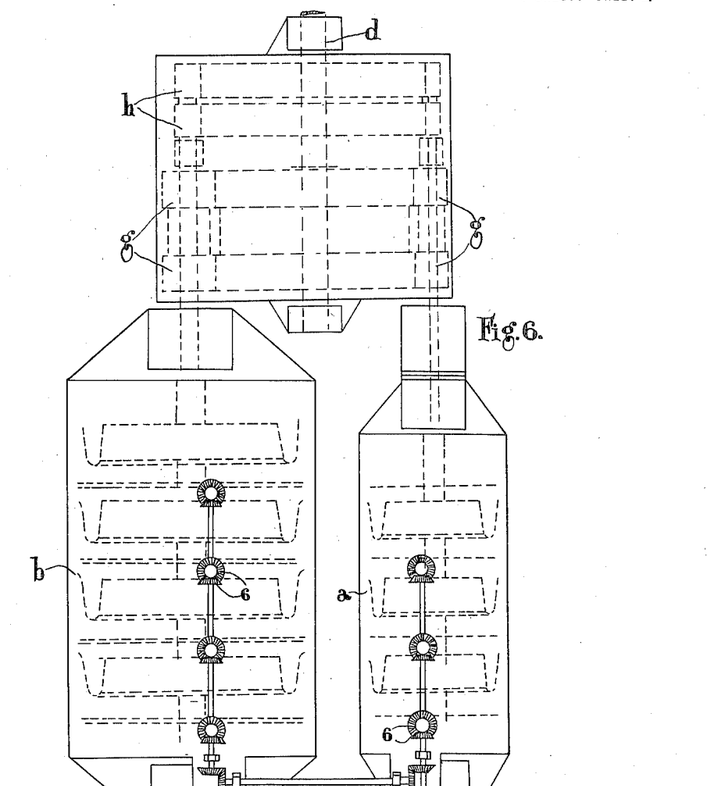
Figure 7:
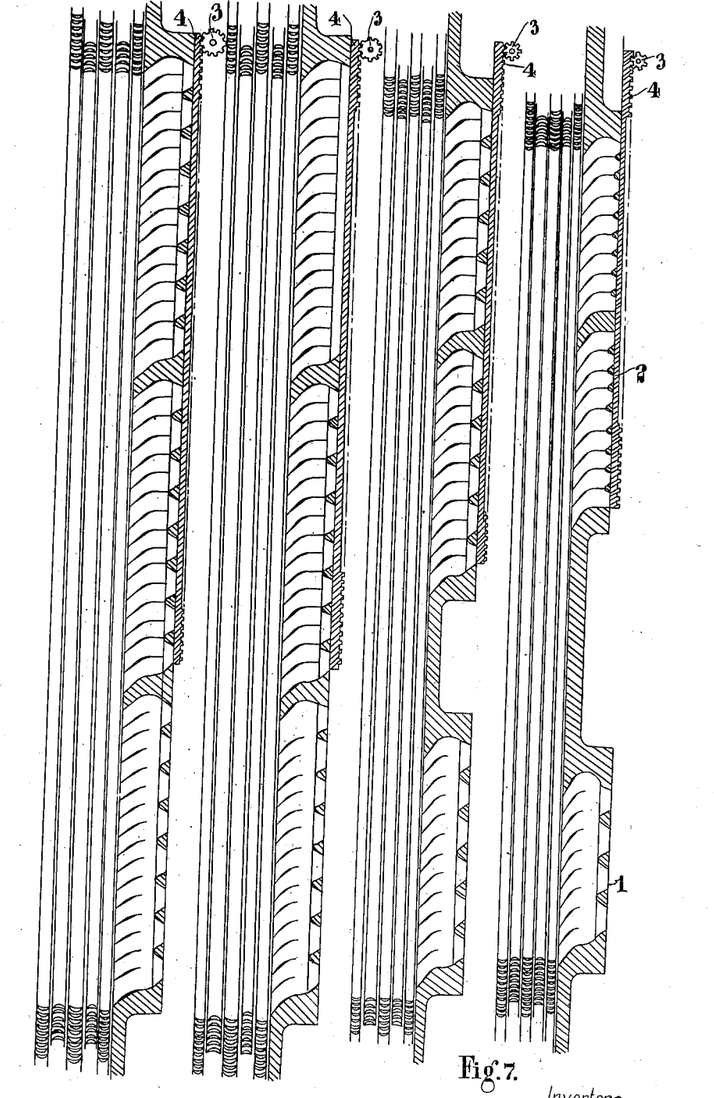
Fig. 7 is a developed view of the nozzles and blades of one of the turbines.

In the modification illustrated in Figs. 6 and 7, the main turbine set is provided with impulse wheels only which are operative at all powers; the nozzles of group 1 which are used for cruising only are unprovided with gate valves, and can only be shut off by the main stop valve. The nozzles of the group 2 which are shut off by the gate valves 5 at cruising power are at full power opened in addition to the group 1. The gate valves can also be used for regulating the number of jets in operation at intermediate powers.

The correct proportion of opening at each stage is determined by the different sizes of pinions 3 engaging with the racks 4 of the gate valves 5, or by the proportion of the bevel wheels 6.

Figure 8:
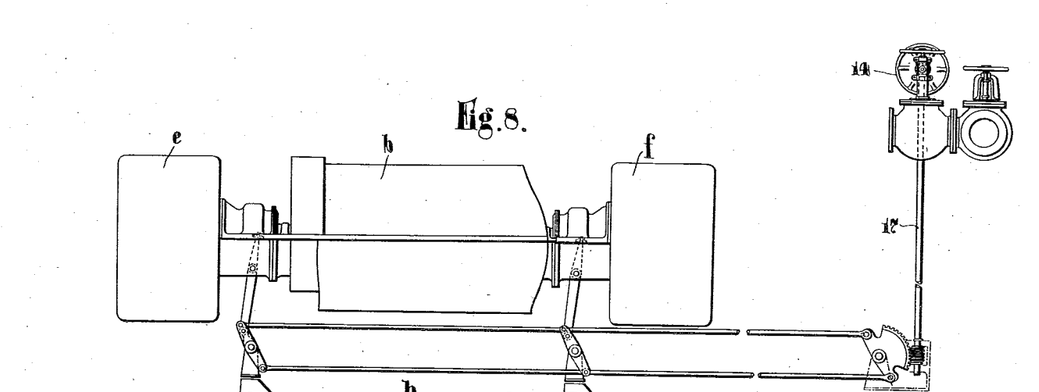
Fig. 8 is a plan view of an installation according to the invention.
Figure 9:
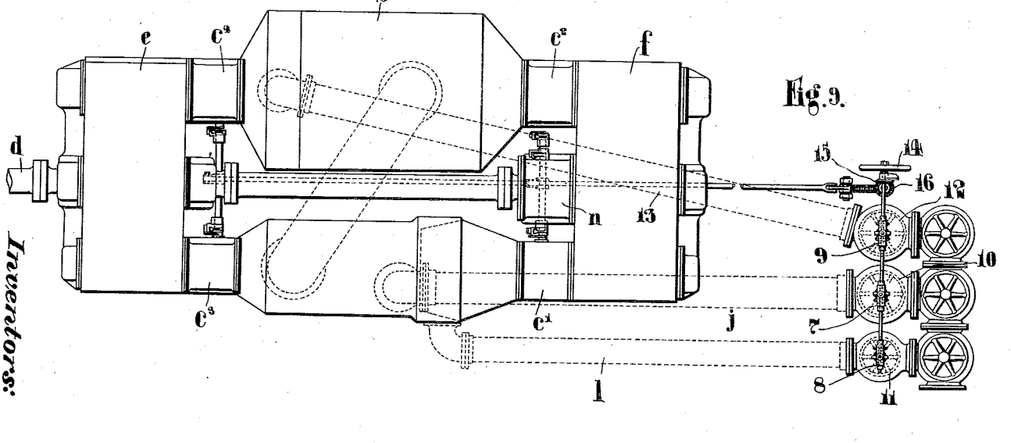
Fig. 9 is a side elevation with the high pressure turbine removed.
Figure 10:
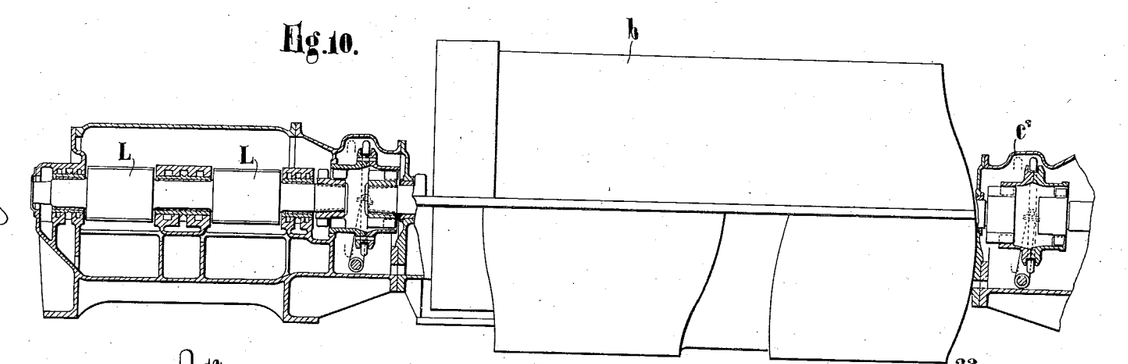

The clutches are operated by the hand wheel 14, working through bevel wheels 15 and 16, to the shaft 17, actuating the sector 41 through the worm 42. This sector actuates the clutches through the rods 43 and levers 44, Fig. 8.

Figure 11:
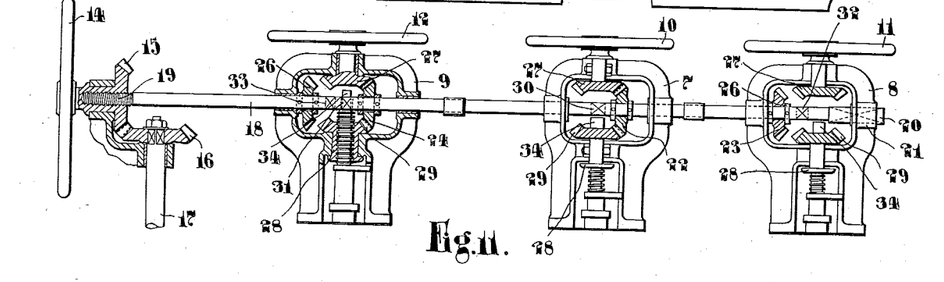
Fig. 11 shows the interlocking mechanism between the clutch operating gear and the valve operating gear.

The interlocking mechanism is shown in detail in Fig. 11. Each of the regulating valve hand-wheels 10, 11, and 12, rotates a bevel wheel 27, and each valve head-nut 28, carries a bevel wheel 29. A locking bar 18, passes through the bridge head of each valve, (its axis passing through the axis of each valve spindle), and is provided with a non-cylindrical part 20, which registers with a similarly shaped hole 21, to prevent rotation. One end of the bar 18, is provided with a screw thread 19, which engages with a female screw thread in the bevel wheel 15. Bevel wheels 22, 23, 24 and 25 are mounted on this bar. These bevel wheels have freedom to rotate, but are constrained in longitudinal position on the bar, by the collars 26. The bar 18 is also provided with holes 30, 31, 32 and 33, so shaped that projections 34, on the valve spindles will just pass into them.

By the engagement of the screw thread 19, with the bevel wheel 15, the bar 18 is moved longitudinally by the clutch operating mechanism, and the bevel wheels 22, 23, 24 and 25 are so disposed along the bar that only 22 and 24 intermesh with wheels 27 and 29 of the full power and astern valves respectively when the full power clutches are in, and only 29 and 25 intermesh with wheels 27 and 29 of the cruising and astern valves respectively when the cruising clutches are in. The holes 30, 31, 32 and 33 are so disposed along the bar that only 30 and 31 are opposite projections 34 of the full power and astern valves respectively when the full power clutches are in, and only 32 and 33 are opposite projections 34 of the cruising and astern valves respectively when the cruising clutches are in.

It will be seen that the position of the bevel wheels 22, 23, 24 and 25 render it impossible to operate a valve until the corresponding clutches are in, and registration of the projections 34 with holes 30, 31, 32 and 33 prevent the opening of the valves until the clutches are properly closed. Further, this registration of the projections 34, prevents the opening of either set of clutches until all valves are closed. If it is desired to permit the cruising valve to open when the full power clutches are in, the bar may be provided with two bevels and two holes at the cruising valve head, as is done in the case of the astern valve.

It will be seen that with a turbine installation of this type, properly designed, it will be possible to obtain equally high efficiencies at low and at full power, and a fairly high efficiency at intermediate powers.

Having now particularly described and ascertained the nature of our said invention and in what manner the same is to be performed we declare that what we claim is:—

1. In a marine turbine installation of the type indicated, including in combination a main turbine set having high and low pressure stages, a shaft, speed ratio changing gearing between the turbines and the shaft, and cruising turbine elements associated with the main set to exhaust directly thereinto.

2. In a marine turbine installation of the type indicated, including in combination a main turbine set having high and low pressure stages, a shaft, two sets of clutch controlled speed ratio changing gearings between the turbines and the shaft, and cruising turbine elements associated with the main set exhausting directly thereinto.

3. In a marine turbine installation of the type indicated including in combination a main turbine set having high and low pressure stages, a shaft, speed ratio changing gearing between the turbines and the shaft, and separate cruising turbines connected with the shaft and exhausting directly into one turbine of the main sets.

4. A marine turbine installation of the type indicated having in combination a main turbine set, a cruising turbine element associated therewith, a shaft, and a change speed mechanism between said turbines and shaft, certain stages of said main turbines being regulatable.

5. A marine turbine installation of the type indicated having in combination a main turbine set, a cruising turbine element associated therewith, a shaft, and a change speed mechanism between said turbines and shaft, certain stages of said main turbines being regulatable, and the remaining stages having the same area for steam flow at all times.

6. A marine turbine installation of the type indicated having in combination a main turbine set, a cruising turbine element associated therewith, a shaft, a change speed mechanism between the turbine and shaft, clutches between the turbines and the speed mechanism, steam supply valves for the turbines, and interlocking means for said valves operable by said clutches to prevent their opening until the clutches are in correct working position.

In testimony whereof, we have affixed our signatures.

CHARLES ALGERNON PARSONS.
ROBERT JOHN WALKER.
STANLEY SMITH COOK.
RAMSAY ALEXANDER SIMON.